March 9, 1954     A. HERRING ET AL     2,671,424
DEVICE FOR INDICATING WHEN THE CONTENTS OF
CONTAINERS HAVE BEEN NEARLY EXHAUSTED
Filed Jan. 21, 1953
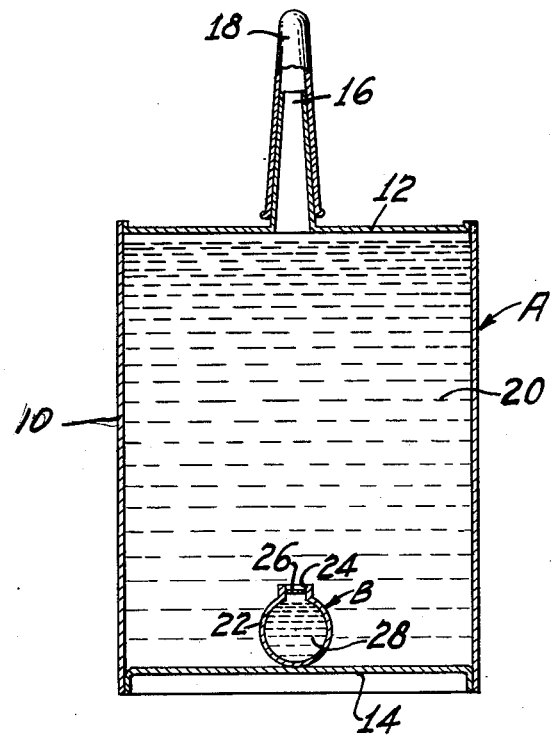
*Fig_1*
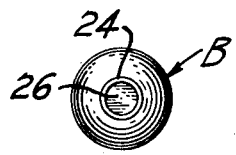
*Fig_2*
INVENTOR.
ARTHUR HERRING AND,
KURT BAUER
BY Harry Langsam
ATTORNEY Patented Mar. 9, 1954

2,671,424

UNITED STATES PATENT OFFICE 2,671,424

DEVICE FOR INDICATING WHEN THE CONTENTS OF CONTAINERS HAVE BEEN NEARLY EXHAUSTED

Arthur Herring and Kurt Bauer, Philadelphia, Pa.

Application January 21, 1953, Serial No. 332,282

3 Claims. (Cl. 116—118)

This invention relates to an indicating means and it particularly relates to an indicating means for substances packed under pressure in a container, whereby it provides an indication that the substance is almost used up.

Many different kinds of substances are packed under pressure today, such as whipped cream, shaving cream, deodorants, etc. These substances may be of the fluid type, either liquid or gaseous, or they may be of the powdered, solid type. In any event, when the nozzle of the container is actuated to open the interior of the container to atmosphere, the pressurized substance will be ejected.

One of the problems in using the aforementioned containers having substances under pressure, is the fact that the opening into the container is generally minute and, even then, is open only long enough to allow the substance to be ejected. It is, therefore, difficult to ascertain when the contents of the container are almost exhausted, so that one may obtain a new container of the substance to have it on hand when needed.

This invention was conceived to solve the above problem by providing a means to color the substance when the container is nearly empty. In this way, if one is using a whipped cream container, and the whipped cream suddenly comes out pink, or whatever other color is desired, the user will realize that the container is nearly empty.

It is, therefore, one object of our invention to provide a means within a container that will automatically indicate the near exhaustion of the contents of a container.

Another object of our invention is to provide an indicating means which is pressure-actuated.

Another object of our invention is to provide a means to indicate the near exhaustion of the contents of a container by coloring the contents.

Another object of our invention is to provide an indicating means which is simple, compact, and easily held within a container.

Other objects of our invention are to provide an improved device of the character described, that is easily and economically produced, which is sturdy in construction, and which is highly effective in operation.

With the above and related objects in view; our invention consists in the details of construction and combination of parts, as will be more fully understood from the following description, when read in conjunction with the accompanying drawing in which:

Fig. 1 is a sectional view of a container showing the indicating device therein, the indicating device also being shown in section.

Fig. 2 is an elevational view of the indicating device.

Referring now in greater detail to the drawing wherein similar reference characters refer to similar parts, we show a container A and an indicating means B within the container. The container A may be constructed of metal, plastic, or the like, but is here illustrated as a metal can having a cylindrical side wall 10 and top and bottom walls 12 and 14. A spout 16 is provided at the top of the can and this spout is adapted to be covered by a cap 18.

Within the can is a substance 20 under pressure. The substance here is illustrated as whipped cream although a variety of other substances may be used, either fluid or comminuted solids. Also within the can under the surface of the whipped cream is a capsule B. The capsule B is here illustrated as a spherical container 22, but this container may be of any desired shape. An opening 24 is formed in the container 22 and this opening is sealed by a thin diaphragm or membrane 26. Within the container 22 is held a substance 28 under pressure which may be either of a colored nature or which, when released from the container 22, will react with the contents of the container A to generate a particular color. This coloring material may be any one of a variety of harmless coloring materials, such as vegetables dyes or the like.

Ordinarily, when the substance 20 in container A is present in sufficient quantity, its pressure on one side of the membrane 26 will counterbalance the pressure of the substance 28 on the other side of the membrane. However, when sufficient of the substance 20 has been removed from the can, the pressure on the inside of the container 22 will be greater than the pressure on the outside, and the membrane 26 will be ruptured, causing an outflow of the coloring material 28 into the can A.

When the container 22 has been filled with the coloring material 28, and the membrane 26 placed within the opening 24, it is capped so that the pressure within the container 22 will not be disrupted. When this is inserted inside of the container 10, then the capping member is removed. This does not present a difficult problem and the indicating container B is readily handled.

Although our invention has been described in considerable detail, such description is intended as being illustrative rather than limiting, since the invention may be variously embodied, and the scope of the invention is to be determined as claimed.

We claim as our invention:

1. In combination, a container for substances under pressure, and an indicating means within said container, said indicating means comprising a receptacle having coloring matter therein, said receptacle being adapted to retain said coloring matter when the pressure of the contents of said container is above a predetermined level, and to release said coloring matter when the pressure of said contents is below said predetermined level.

2. The combination of claim 1 wherein said coloring matter is adapted to be retained with said receptacle by the pressure of the contents of said container.

3. The combination of claim 1 wherein said receptacle is provided with an opening and a membrane sealing said opening, and wherein said coloring matter is under a pressure which is substantially equal to the pressure of the contents of said container when said container is relatively full and which is greater than the pressure of said contents when said container is relatively empty, the pressure of said coloring matter being adapted to rupture said membrane when said pressure exceeds the pressure of the contents of said container.

ARTHUR HERRING.
KURT BAUER.

References Cited in the file of this patent
UNITED STATES PATENTS

| Number | Name | Date |
|---|---|---|
| 2,004,502 | Fieberling | June 11, 1935 |
| 2,407,945 | Bennett | Sept. 17, 1946 |